United States Patent
Jeon

(10) Patent No.: US 8,375,981 B2
(45) Date of Patent: Feb. 19, 2013

(54) PRESSURE CONTROL VALVE

(75) Inventor: Man Suk Jeon, Kyungsangnam-do (KR)

(73) Assignee: Volvo Construction Equipment Holding Sweden AB, Eskilstuna (SE)

( * ) Notice: Subject to any disclaimer, the term of this patent is extended or adjusted under 35 U.S.C. 154(b) by 660 days.

(21) Appl. No.: 12/389,392

(22) Filed: Feb. 20, 2009

(65) Prior Publication Data

US 2009/0211650 A1 Aug. 27, 2009

(30) Foreign Application Priority Data

Feb. 25, 2008 (KR) .................. 10-2008-0016910

(51) Int. Cl.
*F16K 31/12* (2006.01)
*F16K 31/36* (2006.01)
*F16K 31/00* (2006.01)
*F16K 39/00* (2006.01)

(52) U.S. Cl. ............ 137/491; 137/488; 137/492.5; 251/28; 251/63.5; 251/63.6; 251/282

(58) Field of Classification Search ............ 137/488, 137/492, 492.5, 491, 489.5, 495, 625.64; 251/28, 63.5, 63.6, 282
See application file for complete search history.

(56) References Cited

U.S. PATENT DOCUMENTS 6,378,557 B2 * 4/2002 Kawamura et al. ...... 137/625.64
6,986,362 B2 * 1/2006 Cheong ..................... 137/491

* cited by examiner

*Primary Examiner* — Ryan Reis
(74) *Attorney, Agent, or Firm* — Ladas & Parry LLP

(57) ABSTRACT

A pressure control valve is provided, which can variably control the set pressure of a relief valve in accordance with pilot signal pressure that is controlled in an operator's seat and so on when the set pressure of the relief valve required in a replaced working device is changed.

1 Claim, 3 Drawing Sheets

PRESSURE CONTROL VALVE

CROSS-REFERENCE TO RELATED APPLICATION

This application is based on and claims priority from Korean Patent Application No. 10-2008-0016910, filed on Feb. 25, 2008 in the Korean Intellectual Property Office, the disclosure of which is incorporated herein in its entirety by reference.

BACKGROUND OF THE INVENTION

1. Field of the Invention

The present invention relates to a pressure control valve that can variably control a set pressure of relief valves by pilot signal pressure supplied from an outside.

More particularly, the present invention relates to a pressure control valve that can variably control the set pressure of a relief valve in accordance with pilot signal pressure controlled in an operator's seat and so on when the set pressure of the relief valve required in a working device (e.g. an option device) is changed.

2. Description of the Prior Art

In general, a pressure control valve is used within a set pressure of a hydraulic circuit. In the case of replacing a working device in accordance with working conditions, the set pressure of the relief valve is reset in accordance with the replaced working device.

In the case of controlling the set pressure of the relief valve, it is required for an operator to set the pressure of the relief valve as an operator directly confirms a pressure gauge, and this causes the operator inconvenience. In consideration of such inconvenience in use, a device, which enables an operator to control the set pressure of the relief valve by controlling pilot signal pressure on the outside of a cab or in the operator's seat, has been used.

As illustrated in FIG. 1, a conventional pressure control valve includes a first plug 1 having an inlet port 1a into which high-pressure hydraulic fluid from a hydraulic pump P flows and a tank path 1b communicating with a hydraulic tank T; a poppet 2 slidably coupled within the first plug 1 to open/close a flow path between the inlet port 1a and the tank path 1b; a poppet spring 21 elastically supporting the path between the inlet port 1a and the tank path 1b in a closed state by pressing the poppet 2; a guide 20 supporting the poppet spring 21; a pilot poppet 19 draining the hydraulic fluid in a pressure chamber c of the first plug 1 to the hydraulic tank T by opening a flow path of a valve sheet 3 when high pressure that exceeds a preset pressure is generated in the pressure chamber c; a pilot poppet spring 18 elastically supporting the path of the valve sheet 3 in a closed state by pressing the pilot poppet 19; a piston 17 supporting one end of the pilot poppet spring 18, and slidably moving within a screw plug 11 to control the set pressure of a relief valve when pilot signal pressure is supplied; a spring elastically supporting the piston 17; a sleeve on which a pilot port 7a for supplying the pilot signal pressure to the piston 17 is formed; a fastening nut 10 and a second plug 12 fixed to an outer surface and an inner surface of the screw plug 11, respectively, to prevent a pressure change after the set pressure of the relief valve is set.

Hereinafter, the operation of the conventional pressure control valve will be described with reference to the accompanying drawings.

A) In the case where the set pressure is used (i.e. the pilot signal pressure is not supplied from an outside):

Hydraulic fluid discharged from the hydraulic pump P flows into the pressure chamber c of the first plug through the inlet port 1a and an orifice in the poppet 2 in order. At this time, due to a difference in sectional area between hydraulic pressure parts of the poppet 1, the poppet 2 is pressed in right direction as shown in the drawing to keep the flow path between the inlet port 1a and the tank path 1b in a closed state.

If the pressure of the hydraulic fluid supplied to the pressure chamber c reaches the set pressure of the pilot poppet spring 18, the pilot poppet 19 moves in left direction as shown in the drawing to open the flow path of the valve sheet 3. Accordingly, the hydraulic fluid in the pressure chamber c is returned to the hydraulic tank T through a path 5.

Simultaneously, due to the opening of the pilot poppet 19, the pressure of the hydraulic fluid in the pressure chamber c is instantaneously lowered. Accordingly, the poppet 2 moves in left direction as shown in the drawing, and the hydraulic fluid is supplied from the inlet port 1a to the hydraulic tank T through the tank path 1b. At this time, the set pressure is determined in accordance with the elastic force of the pilot poppet spring 18 set by the control of the screw plug 11.

B) In the case where the set pressure is changed (i.e. the pilot signal pressure is supplied from an outside):

The pilot signal pressure from an outside is supplied to the piston 17 through a pilot port 7a of the sleeve 7 and a path 11a formed in the screw plug 11, and thus the piston 17 moves in upper left direction as shown in the drawing (in this case, the spring 14 is compressed).

Accordingly, since the elastic force of the pilot poppet spring 18 is reduced, the set pressure value generated in the hydraulic pump P is reduced, and the set pressure of the relief valve is varied.

In the case where a pipe (not illustrated) for supplying the pilot signal pressure from an outside is jointly connected to a single pilot port 7a, it is interfered with components around the relief valve, and thus it is impossible to jointly connect the pipe to the pilot port 7a.

Also, in the case where a drain hole 15 formed in the screw plug 11 is exposed to an outside and a foreign substance or rainwater flows in through the drain hole 15 after an external coating work, the hydraulic driving surface of the spring 14 or the piston 17 is corroded to shorten the life span of the corresponding component.

Also, frictional resistance is generated by O-rings 9 and 16 mounted to seal a gap between mutual contact surfaces of the piston 17 and the screw plug 11, and an O-ring 13 mounted to seal a gap between mutual contact surfaces of the piston 17 and the second plug 12.

Accordingly, as illustrated in FIG. 2, a hysteresis occurs, whereby the set pressure of the relief valve against the pilot signal pressure supplied from an outside cannot be accurately controlled.

Also, the hydraulic fluid fed from the hydraulic pump P and waiting in the pressure chamber c may leak to the hydraulic tank side T due to a difference between the inner diameter of the first plug 1 and the outer diameter of the poppet 2.

At this time, if load is generated on the inlet port side 1a of the first plug 1, a safety accident, such as falling of a working device (e.g. boom or the like), may occur.

In addition, in the case of setting the minimum pressure of the relief valve, the range of the minimum pressure is enlarged due to tolerance of components constituting the relief valve, and thus it becomes impossible to form the pressure desired by the user (e.g., in the case where the minimum pressure of the relief valve is 100 kg/cm$^2$, the actual pressure may be set to 110 kg/cm$^2$.

SUMMARY OF THE INVENTION

Accordingly, the present invention has been made to solve the above-mentioned problems occurring in the prior art while advantages achieved by the prior art are maintained intact.

An embodiment of the present invention relates to a pressure control valve, in which, in the case of jointly connecting a pipe for supplying pilot signal pressure from an outside to a pilot port, the connection work can be done without being interfered by components around a relief valve.

An embodiment of the present invention relates to a pressure control valve, in which a drain port is separately formed to prevent corresponding components from being corroded due to a foreign substance or rainwater flowing from an outside into the valve.

An embodiment of the present invention relates to a pressure control valve, which can reduce the manufacturing cost since the use of a sealing part (e.g. O-ring) for sealing a gap between contact surfaces of a piston is not required, and can solve the problem that the set pressure of a relief valve against the pilot pressure cannot be accurately controlled due to the frictional resistance caused by sealing mounting.

An embodiment of the present invention relates to a pressure control valve, which can prevent the hydraulic fluid fed from the hydraulic pump and waiting in the pressure chamber from leaking to the hydraulic tank side, and thus can prevent the falling of a working device when load is generated on an inlet port side of a relief valve.

An embodiment of the present invention relates to a pressure control valve, which can keep the reduction of an elastic force of a pilot poppet spring within a preset range, and thus can control the minimum pressure of a hydraulic pump against the pilot signal pressure to be constant.

In order to accomplish these objects, there is provided a pressure control valve, according to an embodiment of the present invention, which includes a sleeve having an inlet port into which hydraulic fluid from a hydraulic pump flows and a tank path communicating with a hydraulic tank; a poppet slidably coupled within the sleeve to open/close a flow path between the inlet port and the tank path; a poppet spring elastically supporting the path between the inlet port and the tank path in a closed state by pressing the poppet; a valve sheet installed to face the poppet so that a set pressure is formed in a pressure chamber of the sleeve; a pilot poppet draining the hydraulic fluid in the pressure chamber to the hydraulic tank by opening a flow path of the valve sheet when high pressure that exceeds the set pressure is generated in the pressure chamber; a pilot poppet spring elastically supporting the path of the valve sheet in a closed state by pressing the pilot poppet; a plug coupled to the sleeve, and having a pilot port formed therein to receive a supply of the pilot signal pressure from an outside; a main piston slidably coupled within a guide coupled to the plug to variably control the set pressure in the pressure chamber in accordance with the pilot signal pressure being supplied through a pilot port; and a control plug movably coupled to the guide to control a set pressure of a spring supporting the main piston.

In a preferred embodiment of the present invention, the pressure control valve further includes a connection member rotatably coupled to an outer side of the plug, and having a path formed therein to communicate with the pilot port.

The pressure control valve according to a preferred embodiment of the present invention may further include a first stopper slidably installed in the guide to face the pilot poppet and to prevent the set pressure of the pilot poppet spring from being lowered below a predetermined value.

The pressure control valve according to a preferred embodiment of the present invention may further include a stepped portion formed on an inner side of the guide to limit the movement of the first stopper within a predetermined section when the set pressure of the pilot poppet spring is lowered.

The pressure control valve according to a preferred embodiment of the present invention may further include a second stopper installed between the main piston and the control plug to limit the movement of the main piston within a predetermined section when the pilot signal pressure is applied to variably control the set pressure of the pressure chamber.

The pressure control valve according to a preferred embodiment of the present invention may further include a sealing part mounted on an outer side of the poppet to seal a gap between mutual contact surfaces of the sleeve and the poppet, so that the hydraulic fluid in the pressure chamber is prevented from leaking to the hydraulic tank through the gap.

A drain port is formed in the control plug to feed the hydraulic fluid in the pressure chamber back to the hydraulic tank when the main piston moves in accordance with a supply of the pilot signal pressure thereto.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. The matters defined in the description, such as the detailed construction and elements, are nothing but specific details provided to assist those of ordinary skill in the art in a comprehensive understanding of the invention, and thus the present invention is not limited thereto.

Figure 3:
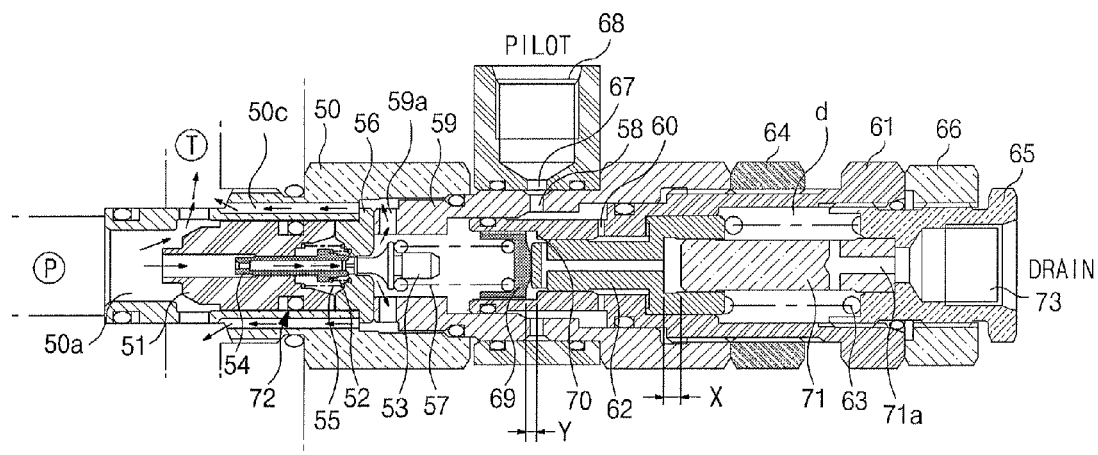
FIG. 3 is a sectional view of a pressure control valve according to an embodiment of the present invention.
Figure 4:
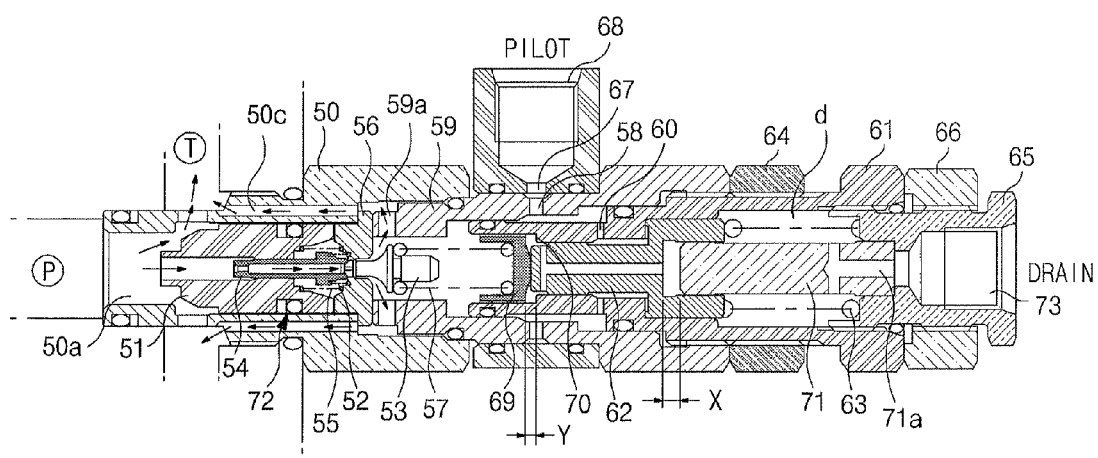
FIG. 4 is a view illustrating the first use state of a pressure control valve according to an embodiment of the present invention.
Figure 5:
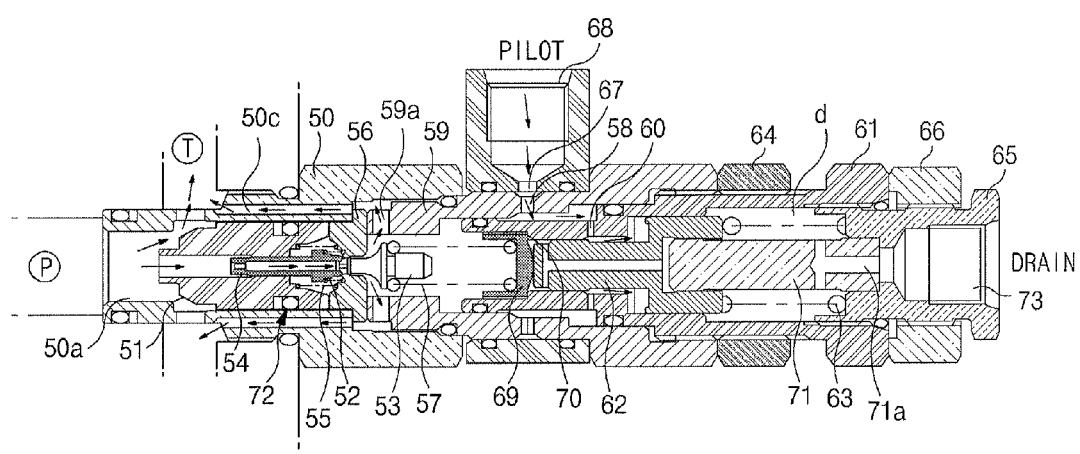
FIG. 5 is a view illustrating the second use state of a pressure control valve according to an embodiment of the present invention.

As shown in FIGS. 3 to 5, a pressure control valve according to an embodiment of the present invention includes a sleeve 50 having an inlet port 50a into which high-pressure hydraulic fluid from a hydraulic pump P flows, and a tank path 50b communicating with a hydraulic tank T; a poppet 51 slidably coupled within the sleeve 50 to open/close a flow path between the inlet port 50a and the tank path 50b; a piston 54 elastically supported by a spring 52 to slidably move within the poppet 51, and becoming in contact with the pilot poppet 53 when it moves by an initial pressure of the hydraulic pump P; a poppet spring 55 elastically supporting the path between the inlet port 50a and the tank path 50b in a closed state by pressing the poppet 51; a valve sheet 56 installed within the sleeve 50 to face the poppet 51 so that a set pressure is formed in a pressure chamber c of the sleeve 50; a pilot poppet 53 draining the hydraulic fluid in the pressure chamber c to the hydraulic tank T via through-holes 59a and 50c by opening a flow path of the valve sheet 56 when high pressure that exceeds the set pressure is generated in the pressure chamber c; a pilot poppet spring 57 elastically supporting the path of the valve sheet 56 in a closed state by pressing the pilot poppet 53; a plug 59 coupled to the sleeve 50, and having a pilot port 58 formed therein to receive a supply of the pilot signal pressure from an outside; a guide 61 movably screw-engaged with the plug 59, and having a through-hole 60 formed thereon to receive a supply of the pilot signal pressure through the pilot port 58; a main piston 62 slidably coupled within the guide 61 to variably control the set pressure in the pressure chamber c in accordance with the pilot signal pressure being supplied through a pilot port 58 and a through-hole 60; a control plug 65 movably coupled to an outer end of the guide 61 to control the set pressure of a spring 63 elastically supporting the main piston 62; and a fastening part 64 (e.g. nut) fixed to the guide 61 and a fastening part 66 (e.g. nut) fixed to the control plug 65 so as to prevent the pressure change after the set pressure of the relief valve is set.

The pressure control valve according to an embodiment of the present invention further includes a connection member 68 rotatably coupled to an outer side of the plug 59, and having a path 67 formed therein to communicate with the pilot port 58.

The pressure control valve according to an embodiment of the present invention further includes a first stopper 69 slidably installed in the guide 61 to face the pilot poppet 53 and to prevent the set pressure of the pilot poppet spring 57 from being lowered below a predetermined value.

The pressure control valve according to an embodiment of the present invention further includes a stepped portion 70 formed on an inner side of the guide 61 to limit the movement of the first stopper 69 within a predetermined section Y when the set pressure of the pilot poppet spring 57 is lowered.

The pressure control valve according to an embodiment of the present invention further includes a second stopper 71 installed between the main piston 62 and the control plug 65 to limit the movement of the main piston 62 within a predetermined section X when the pilot signal pressure is applied through the connection member 68 to variably control the set pressure of the pressure chamber c.

The pressure control valve according to an embodiment of the present invention further includes a sealing part 72 (e.g. a backup ring and an O-ring) mounted on an outer side of the poppet 51 to seal a gap between mutual contact surfaces of the sleeve 50 and the poppet 51, so that the hydraulic fluid in the pressure chamber c is prevented from leaking to the hydraulic tank T.

A drain port 73 is formed in the control plug 65 to feed the hydraulic fluid in a back pressure chamber d back to the hydraulic tank T when the main piston 62 moves in accordance with a supply of the pilot signal pressure thereto through the connection member 68.

Hereinafter, the operation of the pressure control valve according to an embodiment of the present invention will be described with reference to the accompanying drawings.

A) In the case where the set pressure is used (i.e. the pilot signal pressure is not supplied from an outside):

Hydraulic fluid discharged from the hydraulic pump P flows into the pressure chamber c of the sleeve 50 through the inlet port 50a and an orifice in the poppet 51. At this time, due to a difference in sectional area between hydraulic pressure parts of the poppet 51, the poppet 51 is pressed in left direction as shown in the drawing to keep the flow path between the inlet port 50a and the tank path 50b in a closed state (See FIG. 3).

If the pressure of the hydraulic fluid supplied to the pressure chamber c reaches the set pressure of the pilot poppet spring 57, the pilot poppet 53 moves in right direction as shown in the drawing to open the flow path of the valve sheet 56. Accordingly, the hydraulic fluid in the pressure chamber c is returned to the hydraulic tank T through a through-hole 50c of the sleeve 50.

Simultaneously, due to the opening of the pilot poppet 53, the pressure of the hydraulic fluid in the pressure chamber c is instantaneously lowered. Accordingly, the poppet 51 moves in right direction as shown in the drawing, and the hydraulic fluid is supplied from the inlet port 50a to the hydraulic tank T through the tank path 501b. At this time, the set pressure is determined in accordance with the elastic force of the pilot poppet spring 57 set by the control of the guide 61 (See FIGS. 4 and 5).

B) In the case where the set pressure is changed (i.e. the pilot signal pressure is supplied from an outside):

As illustrated in FIG. 5, the pilot signal pressure from an outside is supplied to the main piston 62 through the path of the connection member 68, a pilot port 58 of the plug 59 and a through-hole 60 of the guide 61 in order. At this time, due to the difference in section area between hydraulic pressure parts of the main piston 62, the main piston 62 moves in right direction as shown in the drawing (at this time, the spring 63 is compressed).

That is, since the spring 63 is compressed due to the movement of the main piston 62, and the elastic force of the pilot poppet spring 57 is reduced simultaneously, the set pressure value generated in the hydraulic pump P is reduced, and the set pressure of the relief valve is varied.

On the other hand, the connection member 68 supplying the pilot signal pressure from the outside is rotatably coupled to the outer side of the plug 59 (i.e., 360° rotatable in Y-axis direction), and thus in the case where a pipe (not illustrated) for supplying the pilot signal pressure is jointly connected to the pilot port 58, it is not interfered with components around the relief valve, and thus it is possible to continue the connection work.

Also, since the use of O-rings for sealing the gap between the contact surfaces of the main piston 62 is not required, the frictional resistance occurring due to the O-ring mounting is prevented, and thus the set pressure of the relief valve against the pilot pressure can be accurately controlled.

Also, by the sealing part 72 mounted on the outer side of the poppet 51 to seal the gap of the contact surfaces of the poppet 51 and the sleeve 50, the hydraulic fluid waiting in the pressure chamber c is prevented from leaking to the hydraulic tank side T through the gap. Accordingly, even in the case where load is generated on the inlet part side 50a of the relief valve, the falling of a working device can be prevented.

Also, since the drain port 73 for feeding the hydraulic fluid in the back pressure chamber d back to the hydraulic tank T is separately formed in the control plug 65, the permeation of a foreign substance or moisture such as rainwater and so on through the drain port 73 can be prevented. Accordingly, the corrosion of the hydraulic driving surfaces of the main piston 62 or the spring 63 can be prevented.

Also, after the initial pressure setting (corresponding to the state as illustrated in FIG. 4), the pilot signal pressure is applied from the outside through the connection member 68, and the main piston 62 moves in right direction as shown in the drawing (i.e. as shown in FIG. 4, the main piston moves in X-axis direction within the range "X"). At this time, the hydraulic fluid in the back pressure chamber d is returned to to the embodiments of the present invention has the following advantages.

In the case of jointly connecting a pipe for supplying the pilot signal pressure from an outside to the pilot port, the connection work can be easily done without being interfered by components around the relief valve, and thus the workability can be improved.

Also, the drain port is separately formed to prevent the components from being corroded due to a foreign substance or rainwater flowing from an outside into the valve, and thus the shortening of the life span of the corresponding components can be prevented.

Also, the use of O-rings for sealing the gap between the contact surfaces of the piston is unnecessary, and thus the manufacturing cost of the valve is reduced. Also, the problem that the set pressure of the relief valve against the pilot pressure cannot be accurately controlled due to the frictional resistance occurring during the mounting of the O-rings can be solved, and thus the reliability of the valve can be improved.

Also, the hydraulic fluid fed from the hydraulic pump and waiting in the pressure chamber is prevented from leaking to the hydraulic tank side, and thus the falling of a working device can be prevented even when load is generated on an inlet port side of a relief valve.

Also, after the initial pressure of the relief value is the hydraulic tank T through the through-hole 71*a* of the second stopper 71 and the drain port 73.

When the main piston 62 moves, the first stopper 69 also moves in right direction as shown in the drawing. Accordingly, the set pressure of the pilot poppet spring 57 is reduced.

At this time, the first stopper 69 slidably moves in X-axis direction within the range "Y" (See FIG. 4). That is, the moving distance of the first stopper is limited by the stepped portion 70 formed on the inner side of the guide 61 (as illustrated in FIG. 4, the first stopper moves as much as "Y" at maximum).

Accordingly, the minimum pressure of the hydraulic pump P, which is decreased as the pilot signal pressure being supplied to the main piston 62 is increased, can be accurately controlled. That is, since the minimum pressure of the hydraulic pump P against the pilot signal pressure can be accurately controlled, the low-pressure forming range of the relief valve can be kept constant.

Figure 1:
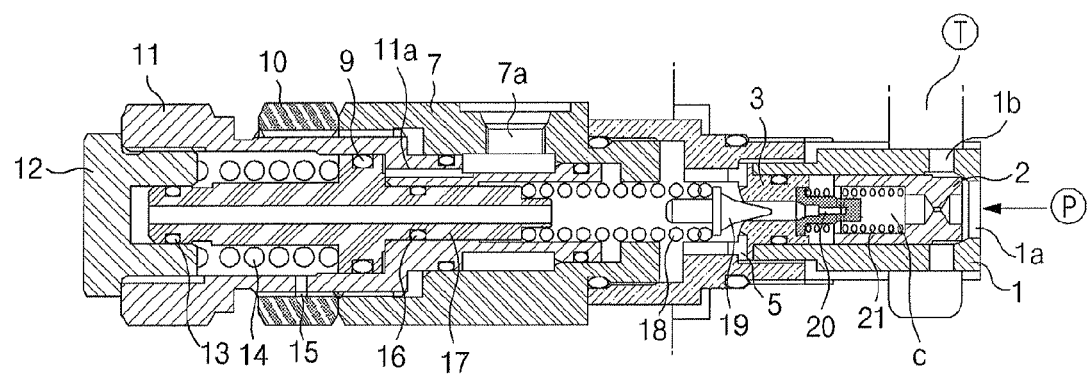
FIG. 1 is a sectional view of a conventional pressure control valve.
Figure 2:
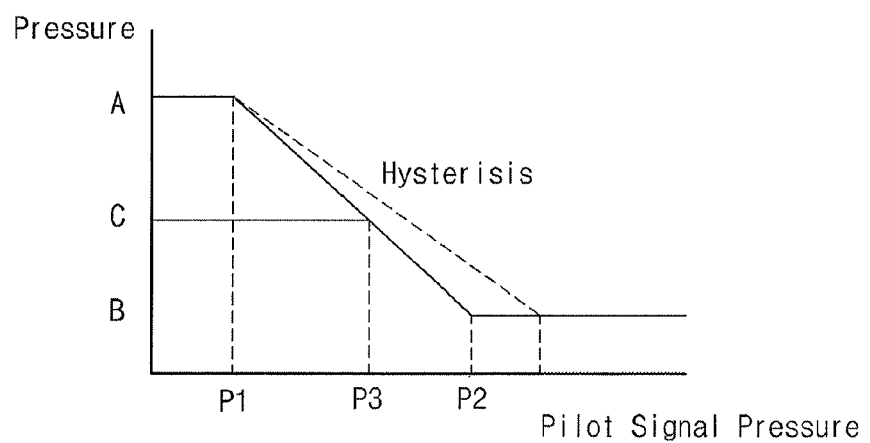
FIG. 2 is a graph explaining the control of the set pressure of the pressure control valve in accordance with the pilot signal pressure.

As illustrated in FIG. 2, in accordance with the control of the pilot signal pressure, the set pressure of the relief valve desired by the user can be variably controlled. That is, the set pressures A, B, and C of the relief valve can be respectively controlled to correspond to the pilot signals P1, P2, and P3, respectively.

As described above, the pressure control valve according set, the minimum value of the hydraulic pump against the pilot signal pressure can be controlled constantly by keeping the elastic force reduction range of the pilot poppet spring with a predetermined value, and thus a low-pressure setting required by the user becomes possible.

Although preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A pressure control valve, comprising:
    a sleeve having an inlet port into which hydraulic fluid from a hydraulic pump flows and a tank path communicating with a hydraulic tank;
    a poppet slidably coupled within the sleeve to open/close a flow path between the inlet port and the tank path;
    a piston elastically supported by a spring to slidably move within the poppet, and becoming in contact with a pilot poppet when the piston moves by an initial pressure of the hydraulic pump;
    a poppet spring elastically supporting the path between the inlet port and the tank path in a closed state by pressing the poppet;
    a valve sheet installed to face the poppet so that a set pressure is formed in a pressure chamber of the sleeve;
    said pilot poppet draining the hydraulic fluid in the pressure chamber to the hydraulic tank by opening a flow path of the valve sheet when high pressure that exceeds the set pressure is generated in the pressure chamber;
    a pilot poppet spring elastically supporting the path of the valve sheet in a closed state by pressing the pilot poppet;
    a plug coupled to the sleeve, and having a pilot port formed therein to receive a supply of the pilot signal pressure from an outside;
    a main piston slidably coupled within a guide coupled to the plug to variably control the set pressure in the pressure chamber in accordance with the pilot signal pressure being supplied through the pilot port;
    a control plug movably coupled to the guide to control a set pressure of a spring supporting the main piston;
    a connection member rotatably coupled to an outer side of the plug, and having a path formed therein to communicate with the pilot port;
    a first stopper slidably installed in the guide to face the pilot poppet and to prevent the set pressure of the pilot poppet spring from being lowered below a predetermined value;
    a stepped portion formed on an inner side of the guide to limit the movement of the first stopper within a predetermined section when the set pressure of the pilot poppet spring is lowered;
    a second stopper installed between the main piston and the control plug to limit the movement of the main piston within a predetermined section when the pilot signal pressure is applied to variably control the set pressure of the pressure chamber; and
    a sealing part mounted on an outer side of the poppet to seal a gap between mutual contact surfaces of the sleeve and the poppet, so that the hydraulic fluid in the pressure chamber is prevented from leaking to the hydraulic tank through the gap,
    wherein a drain port is formed in the control plug to feed the hydraulic fluid in the pressure chamber back to the hydraulic tank when the main piston moves in accordance with a supply of the pilot signal pressure thereto.

* * * * *